3,432,030
PROCESS FOR TREATING MINERALS
James P. Olivier, Macon, Ga., assignor to Freeport Sulphur Company, New York, N.Y., a corporation of Delaware
No Drawing. Filed Oct. 15, 1965, Ser. No. 496,692
U.S. Cl. 209—5        15 Claims
Int. Cl. B03d *3/06;* B03b *1/04*

ABSTRACT OF THE DISCLOSURE

Process for beneficiating a mineral matter. The process involves extracting the mineral matter, which has been conditioned with specific conditioning agents, with a water insoluble, nonionizable organic liquid. The process enables the removal of discoloring impurities, particularly titanium dioxide, from mineral matter of any particle size.

---

The present invention relates to a process for beneficiating minerals and ores by separating and concentrating such mixtures into components by a selective extraction process. More particularly the present invention concerns a concentration process whereby discoloring mineral components are removed from aluminosilicious components such as kaolin clay; or valuable mineral or ore components such as iron oxide ($Fe_2O_3$) are separated from silicious components as silicon dioxide.

Impurities are invariably associated in nature with minerals and ores. Illustrative of such minerals is kaolin clay which occurs as a fine-grained mineral made up of particles chiefly 5 microns in size and smaller. Typically, kaolin clays are composed of a substantial portion of the desired kaolinite and may additionally have varying amounts of such clay minerals as nacrite, halloysite, endellite, dickite, montmorillonite, attaplugite and illite.

Kaolin clay as mined is impure, being mechanically associated with varying amounts of other clay minerals together with accessory minerals such as mica, quartz, feldspar, crystobalite, ilmenite, zircon, anatase, rutile and iron oxides. A pure kaolinite crystal is a hydrous aluminosilicate comprised of the elements hydrogen, oxygen, aluminum and silicon. In addition to those elements, it is said that about two dozen other elements may be detected in kaolin clay by chemical analysis. These additional elements include carbon, magnesium, calcium, sodium, potassium, iron and titanium. Since pure kaolinite is colorless, the commonly observed discoloration of kaolin clay must be attributed to impurity elements that are found either in an inorganic or organic form in the clay. These very finely divided discoloring impurities greatly detract from the value and usefulness of the clay for many applications, as for instance in the making of high quality paper, where a very white pigment is required.

Titanium dioxide ($TiO_2$), usually in the form of anatase and rutile, is recognized to be an extremely important discoloring impurity in kaolin; presumably this is because iron is incorporated into the crystalline lattice of the anatase and rutile to give a highly colored pigment, since pure anatase or rutile is ordinarily a very white substance. As little as 1% iron, or less, as impurity in anatase or rutile, will suffice to render it highly colored; the high refractive index of $TiO_2$ making it especially potent as a discolorant. As used in the application, the term "titanium dioxide" refers to the impure form of anatase and rutile.

Processes for separating and concentrating ores and minerals into components have included two general approaches; direct chemical attack on one or more components of the minerals and ores leading to their removal as new chemical compounds, or physical processes that achieve selective separation of one or more of the components from the minerals and ores.

Direct chemical attack has not proven always to be completely effective and economically feasible. For example, while titanium oxide may be dissolved and substantially removed from kaolin clay by resorting to hot, strong acids, the kaolinite itself is thereby attacked, and its structure destroyed, thus degrading many of its valuable properties. With conventional bleaching processes employing weakly acidic, strongly reducing conditions, the gain in brightness of kaolin clay is limited, since the $TiO_2$ content of the clay remains unaffected.

Various methods of physically separating and concentrating minerals and ores are known in the art. A prerequisite to all such methods is that the feed material be crushed or ground to a degree of fineness such that mechanical interlocking between the various mineral components present has been substantially eliminated. Component separation of the minerals and ores can then be performed by a particle size classification step in those cases where the particles of the component minerals differ sufficiently in size. Kaoline clays, for example, are commonly subjected to a particle size classification step during processing in order to recover a fine kaolin fraction of better brightness and color; the coarse fraction resulting from this separation contains most of the sand and mica originally present. However, with domestic sedimentary kaolin clays, such as with the Georgia kaolins, it usually happens that while the fine kaoline fractions recovered from a particle size classification process have a better color, they also have an increased content of discoloring $TiO_2$ impurity, since titanium discoloring impurity mineral components in domestic sedimentary kaolin clays have an effective particle size distribution that overlaps the desirable clay size ranges. This seeming contradiction in brightness is explained by the fact that the brightness of a kaolin clay is powerfully controlled by its particle size as well as by its impurity content; the improved brightness of the fractionated kaolin clay is presumably caused by the much greater light-scattering and reflecting ability of the finer kaolinite particles that thus more than compensates for the presence of increased amounts of impurity. The increase in brightness, however, that can be achieved by reducing the particle size of the clay is inherently limited by the physical fact that particles smaller than about one-half the wavelength of visible light no longer scatter or reflect the light as effectively. Hence brightness is lost on reduction of particle size below about 0.2 micron.

A widely used method for accomplishing the physical separation of mineral and ore mixtures is the froth flotation technique. Herein a mineral mixture, crushed and ground, where necessary, to a size range generally between 40 and 200 mesh (ca. 400 to 74 microns), is made into an aqueous dispersion. The resulting aqueous mineral pulp is conditioned for flotation by agitation with a reagent capable of selectively coating, or oiling, a particular component of the feed, rendering that component non-wettable by water. Frothing is then produced by the admission of air to the agitated pulp; the collector-coated component of the feed, by attachment to the air bubbles, is carried into the froth, which is continuously removed; resulting in a froth product containing a large percentage of the oiled component of the feed, and a machine discharge product that is a concentrate of the non-oiled, water-wettable feed component.

It is essential in the forth flotation process that the component particles of the mineral and ore mixtures being treated have a size within a range bounded by an upper limit, above which the gravitational force acting on an oiled particle exceeds the strength of adhesion of the particle to the air interface, and a less definite lower limit below which particle attachment to an air interface becomes so inefficient as to make flotation separation impractical. This restriction on the fineness of feed represents one of the most serious limitations of the froth flotation technique. Particles of feed smaller than 200 mesh (i.e. smaller than 74 microns) tend to be poorly concentrated by froth flotation and may actually interfere with the concenrtation of more suitably sized particles; this tendency becomes more pronounced with increasing fineness, and particles below 10 microns in size are particularly unsuited for concentration by froth flotation.

Particles of feed below 200 mesh size (below 74 microns) are generally referred to as "slimes" in the flotation art, and it is common practice to "deslime" a feed mixture containing such very finely divided material before flotation by a particle size classification such as a screening or sedimentation step. The presence of particles below 74 microns in mineral or ore mixtures may be a result of the natural state of subdivision of the mineral as mined, or can arise from the grinding necessary to effect mineral liberation.

Many potentially valuable mineral and ore mixtures cannot be effectively beneficiated by froth flotation because of an excessive slime content either formed during grinding or naturally present. Examples of such ores are bog iron ore, limonite, certain taconites, and wad (an earthy manganese ore). Koalin clay is an extreme example of a naturally slimed mineral mixture, being upwards of 80%, and frequently more than 90% finer than 325 mesh (finer than 43 microns) in size. While efforts to employ froth flotation for the separation of discoloring impurities from kaolin clay in order to recover a clay of improved color have been known to give fair results in those cases where only the coarsest clay fractions were used as feed, it has proven ineffective to so treat an unfractionated clay or the finer fractions therefrom by the usual froth flotation techniques. Unfortunately, it is these more valuable fine clay fractions that have the highest content of titanium impurity, and thus would benefit most by being purified.

A modification of the conventional practice of froth flotation comprises adding a finely divided carrier mineral such as calcite to a slimed flotation feed (such as clay) and the mixture then subjected to froth flotation. Certain inherent disadvantages of this modified flotation process exist, however, especially in the treatment of clays, among which are: (1) the dispersed feed slurry is best treated at the relatively low mineral content of 20% or even 10% by weight or less, hence a relatively large volume of slurry must be processed per ton of dry mineral; (2) the initial froth product contains about 50% of the feed mineral, as well as impurities, hence it must be reprocessed to obtain a reasonable yield of product, four stages of flotation being frequently required; (3) it is critical to insure that all traces of carrier mineral are removed from the beneficiated mineral as the presence of carrier mineral would be deleterious in the final product.

A novel process for physically separating discoloring imprities from kaolin clay is an extraction process described in copending application Ser. No. 496,707, entitled "Process for Improving the Brightness of Clay," filed Oct. 15, 1965 by Horton H. Morris and James P. Olivier and assigned to the same assignee as the instant application. In general terms, this process involves treating a dispersed delaminated aqueous clay slurry with a water-insoluble organic liquid, allowing the mixture to stand until the organic layer has separated from the aqueous phase containing the clay solids and then removing the organic layer along with entrained discoloring matter. This extraction process, however, is limited in its applicability; clays from certain mines not responding to give any improved brightness.

Another novel process for physically concentrating clay by the removal of discoloring impurities involves a selective flocculation of the impurities and is described in copending application Ser. No. 496,716, entitled "Process for Treating Clay," filed Oct. 15, 1965 by Paul Sennett and James P. Olivier and assigned to the same assignee as the instant application. This process is quick and economical although it has the disadvantage of causing the simultaneous removal of relatively large amounts of clay with the unwanted flocculated impurity.

It is an object of the present invention to provide a novel process for beneficiating minerals and ores, particularly very finely divided mineral and ore mixtures, such as for example a material containing a substantial number of particles finer than 325 mesh (finer than 43 microns), by concentrating such minerals and ores into one or more of their components.

It is a further object of the present invention to provide a novel selective extraction process for the removal of discoloring components from minerals intended for use as pigments, thereby improving the brightness and whiteness (or the color purity) of such minerals and ores; particularly the removal of such impurities from very finely divided mineral and ore mixtures, as for example from a mixture containing a substantial number of particles finer than 325 mesh, without the attendant foregoing disadvantages.

It is yet an additional object of the present invention to provide a novel process for concentrating the components of a finely divided mineral or ore mixture with a high recovery of the desired mineral and ore components.

A further object of the present invention is to provide commercially acceptable and feasible processes for the concentration of a mineral and ore mixture, and for the removal of discoloring components from minerals or ores intended for use as pigments or extenders.

It is also an object of the present invention to provide a novel selective extraction process of wide applicability for the consistent removal of discoloring components from clays such as a kaolin clay, particularly a finely divided clay mass such as, for example, a mass having a substantial number of particles finer than 325 mesh, with a high recovery of the pure clay.

It is yet another object of the present invention to provide a novel selective extraction process for the removal of discoloring impurities, especially discolored titanium dioxide, from kaolin clays.

Other objects and advantages of this invention will be apparent to those skilled in the art from the following description and examples.

It has been found that the foregoing objectives can be accomplished by a process in which an aqueous dispersion of a mineral and/or ore mixture is mixed with an oleophilic collector reagent that is capable of selectively coating one component of the mineral or ore mixture thus rendering the surface of the component oleophilic; adjusting the pH of the dispersion and controlling the activator ion concentration as required to develop or enhance the selectivity and efficiency of the process; extracting the oleophilic components of the mineral or ore mixture from the aqueous dispersion by bringing the dispersion into intimate contact with a substantially water insoluble organic liquid that is liquid, and nonionizing under the conditions of contact with the aqueous dispersion; separating the aqueous phase which is a concentrate of the "noncollector-coated" mineral or ore components, from the organic liquid phase that retains a concentrate of the "collector-coated" components; and recovering the solid components as desired from each of the phases.

In practicing the process of the present invention the mineral or ore feed used in the process is prepared from the raw material occurring in nature by a conventional crushing or grinding step. If desired the raw material can be subjected, either before or after the grinding, to a conventional chemical treatment or other customary operation. Contrary, however, to the general froth flotation practice, there is no need to avoid slime production in the grinding step, or to remove from the feed the slimes either produced by the grinding or naturally present in the feed. Thus the feed used in the process of the present invention can be provided in a particle size finer than 200 mesh (74 microns) or finer than 325 mesh (43 microns); particles in the size range of 0.05 to 0.2 micron, as measured by electron micrographs, have been separated from kaolin clay by the process of the present invention. The process, however, is not to be restricted to a finely divided feed; particles considerably larger than 200 mesh can be concentrated by the process of the present invention.

The aqueous dispersion of feed used in the process can be prepared subsequent to, or simultaneously with, the reduction of the raw material to a particle size suitable for feed. Generally, the aqueous dispersion of feed contains from about 5 to about 70 weight percent of feed solids. It can be prepared in a conventional manner by agitating the feed with water; the dispersion of the feed can be aided by the use of conventional dispersing agents, e.g., ammonium hydroxide, potassium hydroxide, sodium hydroxide, sodium silicate compositions, tetrasodium pyrophosphate, sodium hexametaphosphate and sodium tripolyphosphate, the non-phosphate dispersants being preferred. Normally 0.05 to 0.5 weight percent of dispersing agent, based on the weight of the dry feed, is employed.

It is preferred that the aqueous dispersion of feed with the oleophilic collector reagent and other desired reagents be prepared by conditioning or agitating the mixture with sufficient intensity, and for sufficient time to insure intimate mixing of all the reagents thereof.

In general, collector reagent concentration will be in the range of about 0.02 to 1 weight percent of dry weight of mineral or ore mixture. Under alkaline extraction conditions and with anionic collector reagents, alkaline earth metal activator ions, i.e., magnesium, calcium, strontium and barium, can be present as desired to enhance the separation. Such ions can result either from the raw material itself, or through extraneous addition.

In the separation of iron ore ($Fe_2O_3$) from silicious components, it is essential for utmost separation that activator ions as calcium ion be substantially absent. Otherwise it has been found that calcium ions will activate the quartz and tend to prevent $Fe_2O_3$ enrichment. If any substantial amount of calcium ion is present in the iron ore as mined, removal of the calcium ion can be readily accomplished through the addition of complexing agents. Conditioning of taconite iron ore is generally carried out in the presence of an anionic collector at an acid pH. Thereupon the water insoluble organic liquid is added, the pH of the mixture made basic and the mixture allowed to separate into two layers.

Cationic collector reagents are generally used in the process of the present invention in the absence of any activator ions, such use being irrespective of the pH of the mixture.

The concentration of the activator ion when used in the process of the invention generally is in the range of 0.02 to 0.15 weight percent by weight of the dry feed as expressed by the stoichiometric calcium oxide equivalent.

The substantially water insoluble organic extractant liquid should be liquid under the conditions wherein the feed dispersion is contacted with the organic material, and should be nonionogenic under those conditions, to preclude reaction and interference with other components of the mixture. It should further be capable of selectively wetting, in preference to water, the surface of the collector-coated component of the feed, causing attachment and adhesion of collector-coated particles at the interface between the aqueous and organic phases. It should also be substantially water-insoluble (solubility of less than about one percent by weight of the aqueous phase at the operating temperature of the process) in order that two liquid phases be maintained to provide an interface for particle attachment and to prevent loss of extractant into the aqueous phase, where its recovery would be difficult and uneconomic. It is also advantageous that the organic liquid have a specific gravity differing appreciably from that of the aqueous dispersion to be treated, although equality of specific gravity can always be prevented by using a more or less concentrated aqueous feed dispersion. Organic liquids that are liquid under the temperature of treatment of 40° F. to 200° F., and give an interfacial tension against water of from 20 to 55 dynes per centimeter at temperatures of the process will have the proper selective wetting ability and are suitable. Examples of such liquids include kerosene; mineral spirits; VM & P naphtha, which is a straight run naphtha chemically treated, from paraffin base or mixed base crudes and has an aromatic content of 20 percent maximum with a volatility of 200–300° F.; various petroleum ethers; benzene; toluene; chloroform; carbon tetrachloride and/or ethylene dichloride. Such liquids can be used alone or in combination with one another.

The organic extractant material can be employed in widely varying amounts ranging from about 3 volume percent to more than 100 volume percent of the aqueous phase (the maximum volume being primarily a question of economics); usually 10 to 50 volume percent is employed, the volume percent being based on the volume of the aqueous dispersion.

The selective extraction of the "collector-coated" feed component from the aqueous dispersion is performed by distributing the organic extractant liquid in such a way that it presents a large interfacial area of contact with the dispersion, for example, emulsifying the extractant as small droplets throughout the dispersion by suitable agitation thus allowing opportunity for the collector-coated component to become attached to the interface. The solids content of the aqueous phase during extraction may be in the range from about 5 to about 70 percent by weight, usually 25 to 35 percent by weight. The intensity of agitation required to distribute the organic extractant liquid into the aqueous dispersion is low; the time of contact required to essentially complete the extraction is variable with the feed, but generally is less than an hour.

The treatment of the aqueous dispersion with the collector and the organic liquid can be performed sequentially or simultaneously. If desired the preparation of the aqueous dispersion can be accomplished simultaneously with the addition of the collector and organic liquids.

Following the extraction of the feed material with the organic liquid extractant, a concentration of the feed into components is accomplished by separating the aqueous phase from the largely organic phase. This may be done by allowing the mixture to stand quiescently until the largely organic phase, by virtue of its differing specific gravity, collects to form a distinct layer; thereupon the two phases may be separated by decantation. Alternative methods include, for example, the application of centrifugal force to hasten the separation.

The aqueous phase containing the concentrated "non-collector-coated" feed components can further be processed as desired; e.g., the solids content may be collected by filtration and the product dried.

The largely organic phase containing the concentrated "collector-coated" feed components may also, if desired, be further processed; for instance, it may be washed to remove entrained aqueous dispersion, thus aiding the degree of concentration; it may be freed of solid collector-coated mineral, e.g., by filtration.

Any finely divided mineral or ore mixture may be treated in accordance with the process of the present invention provided (1) that the components of the mineral or ore mixture whose separation is desired are liberated from each other, (2) that one of the components of the mineral or ore mixture differ from the other to the extent that a substantial amount of said component is capable of having its surface rendered oleophilic by an oleophilic collector reagent and (3) that said selectively wetted components can be "lifted" or carried by the organic liquid droplets.

Ores that can be treated according to the process of the invention include taconite ore, which is an intimate mixture of iron oxide and silicon dioxide, anatase, rutile, goethite, jasper, phosphate ores, copper ores and nickel ores. The process of the present invention is especially beneficial in the treatment of ores that occur naturally in an earthy, clay-like state, or of ores that produce clay-sized material when crushed or ground or of ores which, because of their fine-grained crystalline composition would require very fine grinding to achieve a separation of desirable components.

As already disclosed, the process of the present invention, in comparison with known processes, is particularly effective and especially suitable for the removal of discolored impurities from a clay, such as kaolin clay. As a result it has found primary use in clay processing.

As heretofore discussed, kaolin clay is a very fine-grained mineral generally discolored by the presence of titaniferous and ferruginous impurities. By the process of the present invention, these impurities can be largely removed to yield a clay of greatly improved brightness and value, the process being particularly effective for the removal of discoloring titanium impurities from a mass of kaolin clay having a substantial portion of particles finer than 325 mesh. The brightness of kaolin clays is customarily designated in the art by "G.E." brightness values.[1] Many of the commercial uses for which kaolin clays are produced, e.g. use as a paper coating pigment, for commercial acceptability require a kaolin with a high degree of brightness.

The term "kaolin" or "kaolin clay" as used in the instant application is intended to refer to those clays known in the clay art as kaolin clays and include not only the material as it is found in nature, e.g. associated with silica, mica and/or other accessory minerals, but also processed kaolin clays as conventionally processed or as processed, for example, as described in U.S. Patent 3,171,718 issued Mar. 2, 1965 which patent is assigned to the same assignee as is the instant application, and which disclosure is incorporated herein.

Kaolin clay may be purified and brightened in accordance with the present invention by preparing an aqueous dispersion, or slip, of the clay to be purified, said slip containing a conventional dispersing or deflocculating agent, such as tetrasodium pyrophosphate or sodium silicate, in an amount from about 0.05 to 0.5 percent by weight of dry clay. It is preferred in kaolin clay treatment to use sodium silicate as the dispersing agent, the usual amount being 0.1 to 0.3 percent by weight of dry clay. Prior to its use in the inventive process, the kaolin clay may be subjected to conventional processing operations, e.g., a particle size classification or a delamination procedure, the latter as described in U.S. Patent 3,171,718 cited above.

After preparing the aqueous dispersion, the feed clay slip is treated with an anionic oleophilic collector reagent. Such reagents include oleic acid, tall oil, coconut oil fatty acids, red oil, linoleic acid, stearic acid, lauric acid, resin acids, sulpho-oleic acid, and petroleum sulfonates such as American Cyanamid Reagent 825, as well as the alkali or ammonium salts of such materials; the preferred anionic collector reagent is oleic acid. Usually about 0.02 to 1 weight percent of collector reagent by weight of dry clay is employed, a preferred range being from about 0.1 to 0.6 percent. Using oleic acid, an amount of about 0.4 percent has been found to be especially suitable. The clay solids content of the dispersion can be from about 5 to about 70 weight percent; a solids content of 25 to 35 weight percent is preferred. The pH of the dispersion is adjusted to a range of from about pH 5 to about pH 11, with a range of pH 6 to pH 7 being preferred. It is preferred that the activator ions be present during, or subsequent to, treatment with the collector. Activator ions effective under the conditions of the instant process are the cations of the alkaline earth elements, i.e., magnesium, calcium, strontium or barium, or mixtures of one or more of the foregoing. The total available activator ion, when treating kaolin clay, should be about 0.02 to 0.15 weight percent by weight of dry clay when expressed as the stoichiometric calcium oxide equivalent, with about 0.1 weight percent being preferred. For example, in the presence of 100 parts of clay and employing magnesium in the form of MgO or $MgCl_2$ or $MgSO_4$, 0.072 g. of MgO, 0.17 g. of solid $MgCl_2$ or 0.22 g. of $MgSO_4$ are preferred. (Illustrating with $MgCl_2$, 100 g.

clay × 0.1% × mol. wt. $MgCl_2$/mol. wt. CaO=g.

required of $MgCl_2$.) The feed kaolin clay slip will normally contain some of the required activator ions, chiefly calcium ions, by derivation from the kaolin clay as mined; a deficiency is corrected by addition of the required amount of an oxide, salt, or hydroxide compound of magnesium, calcium, strontium or barium; the added quantity of said compound must be soluble enough to dissolve in the water present in the mixture. The preferred compound for adjusting activator ion content is calcium chloride, although calcium acetate, calcium hydroxide, magnesium sulphate, barium nitrate, etc., may be used.

In a preferred procedure, a conditioning of the aqueous dispersion is carried out after treatment with the collector and activator ion. This conditioning is carried out by agitating the mixture of feed slip, collector reagents and activator ions for from about 5 to about 60 minutes; and 10 or 20 minutes is usually suitable. In the conditioning step, any intensity of agitation that will produce good mixing will suffice, but for optimum results a high intensity of mixing is preferred, such as obtained with a colloid mill, a high speed "Cowles Dissolver" or a "Kady Mill."

The kaolin feed slip is extracted in accordance with the general process of the present invention as outlined above in connection with mineral mixtures in general, by emulsifying into said slip an organic extractant liquid. The organic extractant liquid should meet the limitations as described above in connection with the general process. With kaolin it is preferred to use a hydrocarbon extractant liquid, i.e., VM & P naphtha, the preferred volume being about 30 to 50 percent of the feed slip volume, and also to adjust the pH of the emulsion in the range of about pH 8 to pH 12; a pH of 10.5 is preferred, although it is desirable when magnesium ion is the sole activator ion in the process of the invention that the maximum pH at any time in the process be restricted to about 9.5 to avoid precipitating $Mg(OH)_2$ and hence losing activator ion. The extractant emulsion is agitated to provide the required contact of "collector-coated" impurity particles with the liquid/liquid interface for a period of time, about 30 minutes being suitable. At the end of this time, a concentrated emulsion phase composed largely of organic extractant and carrying a concentrate of discoloring impurity, can be separated from the purified kaolin dispersion by, for instance, allowing the emulsion to stand undisturbed, whereupon the impurity-laden organic phase, by virtue of its lower density, forms a distinct layer on top of the purified slip; the two layers may then be separated by a decantation procedure, and the purified kaolin further processed as desired by usual methods.

The above embodiments may be modified as come within known or customary practice in the art to which the invention pertains. Thus, for example, the process of

---

[1] "G.E." brightness values are determined according to standard TAPPI (Technical Association of the Pulp and Paper Industry) Method T646 m–54, as reported in the Testing Methods—Recommended Practices—Specifications of the Technical Association of the Pulp and Paper Industry.

the invention can be carried out in a continuous manner rather than in a batch manner. Also the organic extractant liquid can be recovered and recirculated for use in the process of the invention.

The following examples are given to aid in understanding the invention but it is to be understood that the invention is not restricted to the specific compositions or conditions of application set forth in the examples. Said examples are illustrative only and should not be construed as limiting the invention, which is properly delineated in the appended claims.

Examples 1–14

(a) A master batch of kaolin clay feed slip was made by dispersing in water a composite sample of Georgia kaolin crude clays from three separate mine locations; about 0.2 weight percent sodium silicate by weight of dry clay was used to deflocculate the dispersion. The crude clay slip was degritted by allowing it to sediment for one minute per inch of depth; the fine fraction remaining in suspension was then further processed by the delamination procedure described in U.S. Patent 3,171,718. This procedure consisted in agitating for 30 minutes a 40% clay solids slurry containing two parts by weight of 18–36 mesh polystyrene-divinyl benzene copolymer beads per one part by weight of dry clay, followed by screening through a 250 mesh screen to remove the beads. The resulting slip was then diluted to about 28% solids by weight. This feed slip had a particle size of about 100% finer than 5 microns and 85% finer than 2 microns equivalent spherical diameter.

(b) A 2500 ml. volume of the 28% koalin feed clip from (a) was charged to a 1 gallon vessel provided with an agitator, the agitator consisting of a 3 inch diameter Cowles Dissolver blade rotated at 9300 r.p.m., the blade being suitably baffled to prevent splashing of slip. The required quantity of oleic acid collector reagent and calcium activator ions as a $CaCl_2$ solution were added to the slip and the whole agitated for 20 minutes. The conditioned slip was then transferred to a 4000 ml. beaker and 750 ml. of VW & P naphtha added. An emulsion was produced by agitating with a turbine-type impeller rotating at about 1400 r.p.m. The pH of the mixture was adjusted to pH 10.5 with NaOH solution and agitation continued for 30 minutes; at this time the contents of the beaker were allowed to stand undisturbed until separation was deemed complete. The impurity-laden organic layer was then removed from the aqueous slip by syphoning, and the quality of the purified clay was determined by chemical analysis and color measurement.

The following Table I shows the amount of collector reagent and calcium ion added in Examples 1 through 14, together with data on product quality. Calcium ion content is expressed in terms of the equivalent percent of CaO; titanium impurity content is expressed in terms of $TiO_2$.

TABLE I

| Example No. | Reagent, Percent CaO added | Concentration, Percent oleic acid | Chemical analysis, Percent $TiO_2$ | G.E. Brightness | Color purity [1] |
|---|---|---|---|---|---|
| Control [2] | | | 1.56 | 87.3 | 2.9 |
| 1 | 0.03 | 0.4 | 0.43 | 91.9 | 1.8 |
| 2 | 0.04 | 0.4 | 0.31 | 92.1 | 1.7 |
| 3 | 0.05 | 0.4 | 0.25 | 91.0 | 1.5 |
| 4 | 0.06 | 0.4 | 0.29 | 90.2 | 1.7 |
| 5 | 0.03 | 0.025 | 0.66 | 91.1 | 2.0 |
| 6 | 0.03 | 0.05 | 0.68 | 91.0 | 1.7 |
| 7 | 0.03 | 0.1 | 0.64 | 90.7 | 1.9 |
| 8 | 0.03 | .3 | 0.47 | 90.7 | 1.9 |
| 9 | 0.03 | .5 | 0.47 | 91.0 | 1.5 |
| 10 | 0.03 | .7 | 0.55 | 88.6 | 2.3 |
| 11 | 0.03 | 1.0 | 1.11 | 88.7 | 2.6 |
| 12 | 0.05 | .3 | 0.25 | 92.9 | 1.4 |
| 13 | 0.05 | .5 | 0.27 | 92.0 | 1.3 |
| 14 | 0.05 | .7 | 0.44 | 90.5 | 1.8 |

[1] Numerical specification for the color purity of a sample is achieved by determining on a chromaticity diagram the relative distance of the sample point and the corresponding spectrum point (i.e. dominant wave length) from the illuminant point. See "Handbook of Colorimetry" by A. C. Hardy, p. 11–12, The Mass. Inst. of Tech. Press (1936).
[2] The control had a calcium content equivalent to 0.055% CaO.

Example 15

A 2500 ml. volume of the kaolin feed slip from (a) of Examples 1–14 was charged to a 1 gallon vessel provided with an agitator, the agitator consisting of a 3 inch diameter Cowles Dissolver blade rotated at 9300 r.p.m., the blade being suitably baffled to prevent splashing of slip. The required quantity of oleic acid collector reagent and calcium activator ions as a $CaCl_2$ solution were added to the slip and the pH of the mixture was adjusted to a pH of 5.5–6.0. After conditioning for 20 minutes, 750 ml. of VM & P naphtha was added, the pH adjusted to 10.5 with NaOH solution and the whole agitated with a turbine-type impeller rotating at about 1400 r.p.m. and continued for 30 minutes; at this time the contents of the beaker were allowed to stand undisturbed until separation was deemed complete. The impurity-laden organic layer was then removed from the aqueous slip by syphoning. Chemical analysis of the clay from the aqueous slip gave a perecntage of $TiO_2$ of 0.20 as compared with a 1.64 percentage of $TiO_2$ in the starting clay used in the process.

Example 16

Example 15 was repeated with the exception that the pH in the conditioning step was maintained at 10.0–10.5 rather than at 5.5–6.0. Chemical analysis of the clay from the aqueous slip gave a $TiO_2$ percentage of 0.47.

Examples 17–21

Two 2500 milliliter batches of the feed slip described in (a) of Examples 1–14 were conditioned for twenty minutes with oleic acid (0.5 based on dry clay weight) and calcium chloride (an amount equivalent to 0.05% CaO was added). The conditioned slip was then divided into five one-liter samples. VM & P naphtha, in an amount equivalent to 30% of the clay slip volume, was added and the pH of the samples adjusted to 8.0, 9.0, 10.0, 10.5 and 11.0, respectively. The mixtures were emulsified for 20 minutes and then subjected to the separation procedure described earlier.

The following Table II shows the percent of titanium impurity (expressed as percent $TiO_2$) remaining in the various products as a function of pH.

TABLE II

| Example No. | Extraction, pH | Chemical analysis, percent $TiO_2$ |
|---|---|---|
| Control | | 1.56 |
| 17 | 8.0 | 1.28 |
| 18 | 9.0 | 0.50 |
| 19 | 10.0 | 0.40 |
| 20 | 10.5 | 0.33 |
| 21 | 11.0 | 0.44 |

Examples 22–25

The process was carried out as outlined in Example 12 above, using a calcium ion addition equivalent to 0.05% CaO, but 0.3% of the collector reagent shown in Table III in place of the oleic acid in Example 12. The titanium content and the brightness and color purity value of the products in Examples 22–25 are shown below in Table III.

TABLE III

| Example No. | Collector reagent used | Amt. reagent used | Chemical analysis, percent $TiO_2$ |
|---|---|---|---|
| Control | | | 1.56 |
| 22 | Oleic acid | 0.3 | 0.25 |
| 23 | Linoleic acid | 0.3 | 0.33 |
| 24 | Lauric acid | 0.3 | 0.59 |
| 25 | Am. Cyan. Reagent 825 | 0.3 | 0.89 |

| | Chemical analysis, percent $Fe_2O_3$ | G.E. brightness | Color purity |
|---|---|---|---|
| Control | 0.23 | 87.3 | 2.9 |
| 22 | 0.19 | 92.9 | 1.4 |
| 23 | 0.19 | 93.2 | 1.43 |
| 24 | 0.23 | 90.4 | 2.9 |
| 25 | 0.23 | 89.9 | 2.3 |

Example 26

A sample of the feed slip described in (a) of Examples 1–14 was selectively extracted, operating on a continuous basis, using 0.5% oleic acid, added calcium ion equivalent to 0.07% CaO and VM & P naphtha. The recovered clay product was bleached in the conventional manner through use of 0.2% (based on weight of clay) of zinc dithionite, and then filtered, rinsed and dried. The sample was evaluated as a paper coating pigment and the data determined on a sheet coated with the material is shown below. Another clay sample was prepared as a control and was treated in a manner similar to that described above, except that the selective extraction process was omitted. Data from a sheet coated with this material are also given below in Table IV for comparison. The sheets were blade coated at 4 lbs. per 1000 square feet on a standard paper body stock with a pigment-casein (16 parts casein based on the pigment) mixture. The sheets were then calendered eight nips at 1600 p.l.i.

TABLE IV

| Calendered sheet data | Sheet coated with product from Ex. 26 | Sheet coated with control sample |
| --- | --- | --- |
| G.E. brightness | 80.0 | 76.1 |
| Color purity | 5.2 | 6.7 |
| Gloss | 69.0 | 68.8 |
| Wax pick | 14.0 | 14.0 |
| Opacity | 91.4 | 91.4 |

The four point improvement in G.E. brightness is remarkable for a coating of this light weight and indicates the value of a high brightness pigment. The product also gives an appreciably whiter sheet as shown by the lower color purity value.

Example 27

A 29% solids clay slip was prepared by dispersing in the water, through the use of sodium silicate (0.2% based on dry clay), a crude kaolin clay. The slip was allowed to sediment for one minute per inch of depth to eliminate most of the sand, mica and other coarse contaminants. The clay fraction remaining in suspension was then conditioned with added calcium chloride in an amount equivalent to 0.05% CaO and with 0.3% oleic acid, for 20 minutes, through use of the Cowles-type dissolver described earlier. The slip pH was adjusted to a pH of 10 through use of a sodium hydroxide solution and the slip was then emulsified with 30 volume percent of VM & P naphtha.

The mixture was allowed to stand undisturbed until the layers had separated. Then the organic layer, with associated discolored impurities, was removed and the clay recovered from the aqueous layer. The clay was then bleached, filtered, and dried by conventional procedures. The brightness values and the titanium content of the product and of a control sample are given below.

| | Chemical analysis, percent $TiO_2$ | G.E. brightness | Color purity |
| --- | --- | --- | --- |
| Control for Example 27 | 1.70 | 86.5 | 3.5 |
| Product from Example 27 | 0.38 | 90.7 | 1.9 |

This example illustrates the application of the selective extraction process to the preparation of extremely white and high brightness clays from average quality crude clay.

Example 28

A clay slip similar to the one described in Example 1 was prepared and was then subjected to the selective extraction process on a continuous flow basis, the added calcium ion content (expressed as percent CaO) being held at 0.05 and the oleic acid content being held at 0.5%. The slip was properly conditioned by controlling its rate of flow through a tank equipped with a Cowles-type dissolver. VM & P naphtha was used as the organic phase. A purified clay product was withdrawn continuously at a rate of ca. 12 lbs./hr. and was flocculated, bleached, filtered and dried in the conventional manner. The product had the following properties, as compared to the starting material:

| | Chemical analysis, percent $TiO_2$ | G.E. brightness | Color purity |
| --- | --- | --- | --- |
| Product from Example 28 | 0.48 | 92.1 | 1.9 |
| Control for Example 28 | 1.56 | 89.0 | 2.6 |

The organic layer with the entrained discoloring impurities was carefully washed with water, and was then treated with a trace of sulfuric acid and filtered. The impurity retained on the filter was found to consist of very finely divided (predominantly below one micron) particles of an iron-discolored titanium oxide and some kaolin clay. This product had a $TiO_2$ content of about 20%, as compared to 1.6% $TiO_2$ in the starting material. The material was subjected to two more stages of selective extraction and the final product (associated with the organic layer) contained about 90% $TiO_2$.

This represents a very marked concentration of the titanium ore and it is of particular significance that a separation of particles finer than one micron from a gangue which was primarily finer than five microns was accomplished in such a highly efficient manner, and illustrates the separation of an extremely fine material from a "slime" which in itself would heretofore have been considered an unsuitable feed for a separation process.

Example 29

A 200 g. portion of crude kaolin clay was dispersed in 500 ml. of water, to which 0.03% of sodium silicate dispersant had been added. A 0.2 g. portion of calcium chloride and a 1.0 g. portion of oleic acid was added and the mixture was then stirred in a Waring Blendor for twenty minutes. At the end of this time, the mixture was transferred to a beaker, the pH adjusted to 10.5 through use of a solution of sodium hydroxide, and 200 ml. of VM & P naphtha was added. The mixture was then stirred for 15 minutes, using a 2″ diameter, propeller-type agitator operating at ca. 1800 r.p.m. At the end of this time the mixture was placed in a separatory funnel and the layers were separated. The organic layer and associated interface material was acidified by the addition of a trace of sulfuric acid (to increase filtration rate), filtered, dried and analyzed. Analysis of this "residue" is given in the following Table V. The aqueous layer, containing some 94% of the crude clay, was acidified to pH 4 using sulfuric acid, bleached by the addition of 0.1% (based on dry clay content) of sodium dithionite, filtered, and the filter cake dried. Analysis of this "product" showing the removal of $TiO_2$ and $Fe_2O_3$, G.E. brightness, and color purity values is given in the following Table V. Similar data are given for the crude clay starting material. The marked improvement in brightness and color purity is especially startling when it is realized that the quartz and mica impurities commonly associated with crude clay were not removed from this sample before it was treated.

TABLE V

| Description | G.E. brightness | Color purity | Chemical analysis | |
| --- | --- | --- | --- | --- |
| | | | Percent $TiO_2$ | Percent $Fe_2O_3$ |
| Starting material | 83.9 | 4.5 | 1.50 | 0.21 |
| Product | 89.7 | 1.8 | 0.58 | 0.19 |
| Residue | 77.2 | 8.3 | 16.4 | 0.39 |

Example 30

To show the beneficiation of iron ore by the process of the present invention, a sample of taconite iron ore was crushed and ground with water in a ball mill until it would pass through a 325 mesh screen. A 200 ml. portion of the ground ore slurry, containing 70 grams of solids, was treated with 0.5 ml. of a 7% sodium oleate solution and the pH adjusted to 3 with sulfuric acid. The mixture was conditioned by agitating in a Waring Blendor for 5 minutes. The slurry was then diluted with water to a volume of about 2 liters, and 800 ml. of VM & P naphtha was added, together with 0.5 ml. of a 37% sodium silicate solution and adjusted to pH 9.7 with NaOH. The mixture was agitated for 10 minutes with a propeller type stirrer and then allowed to separate into two layers, which were subsequently separated.

The original ore, by chemical analysis, contained about 57.5% $Fe_2O_3$ and 42.5% $SiO_2$ as hematite and quartz respectively. The ore fraction associated with the naphtha contained about 75% $Fe_2O_3$ and 25% $SiO_2$ and represented 46.5% of the feed. The product was much deeper in color than the starting material and is valuable in coloring a red paint. The material in the aqueous phase contained 42% $Fe_2O_3$ and 58% $SiO_2$.

For brevity, various features have been illustrated and described in connection with a limited number of illustrative embodiments. It is intended that these features be used also in combination with features shown in other embodiments without departing from the spirit of the invention.

The terms and expressions that have been employed in the specification are used as terms of description and not of limitation, and there is no intention in the use of such terms and expressions of excluding any equivalents of the features shown and described or portions thereof, since it is recognized that various modifications are possible within the scope of the invention claimed.

What is claimed is:

1. Process for beneficiating a clay mass consisting essentially of (a) intimately mixing said clay mass with water and a deflocculating agent to produce an aqueous deflocculated dispersion of a clay having a pH of 5–11; (b) subjecting the dispersion to intense agitation in the presence of an anionic collector reagent selected from the group consisting of fatty acids, resin acids, petroleum sulfonates and salts thereof, said collector reagent capable of selectively coating one component of said clay dispersion and rendering said component oleophilic, and a controlled amount of a water soluble alkaline earth metal ion; (c) adding a substantially water insoluble, nonionizable organic liquid that is liquid under the conditions of contact to the clay-water dispersion and emulsifying the mixture at a pH of about 8–12, said organic liquid thus providing an extended interface to act as an extractant for removal of the clay impurities; (d) allowing the emulsion to separate into a clay-water layer and an organic liquid-rich emulsion layer with the clay impurities concentrated at the interface of the organic liquid droplets; (e) separating the resultant clay-water layer from the resultant organic-rich emulsion layer that contains the impurities concentrated at the interface; and (f) recovering a clay product of improved brightness from the clay-water layer.

2. Process according to claim 1 wherein the organic liquid is recovered from the resultant organic liquid phase.

3. Process for beneficiating a clay mass consisting essentially of (a) intimately mixing said clay mass with water and a deflocculating agent to produce an aqueous deflocculated dispersion of a clay mass having a pH of about 5–11; (b) subjecting the dispersion to intense agitation in the presence of an anionic collector reagent selected from the group consisting of fatty acids, resin acids, petroleum sulfonates and salts thereof, said collector reagent capable of selectively coating one component of said clay dispersion and rendering said component oleophilic, and a controlled amount of a water soluble alkaline earth metal ion; (c) adding a substantially water insoluble, non-ionizable organic liquid that is liquid under conditions of contact to the clay-water dispersion and emulsifying the mixture while adjusting the pH of the aqueous dispersion to about 8–12; said organic liquid thus providing an extended interface to act as an extractant for removal of the clay impurities; (d) allowing the emulsion to separate into a clay-water layer and an organic liquid-rich emulsion layer with the clay impurities concentrated at the interface of the organic liquid droplets; (e) separating the resultant clay-water layer from the resultant organic-rich emulsion layer that contains the impurities concentrated at the interface; and (f) recovering a clay product of improved brightness from the clay-water layer.

4. Process for beneficating a clay mass consisting essentially of (a) intimately mixing said clay mass with water and a deflocculating agent to produce an aqueous deflocculated dispersion of a clay mass having a pH of about 5–11; (b) subjecting the dispersion to intense agitation in the presence of about 0.02 to 1.0 weight percent by weight of dry clay mass of an anionic collector reagent selected from the group consisting of fatty acids, resin acids, petroleum sulfonates and salts thereof, said collector reagent capable of selectively coating one component of said clay dispersion and rendering said component oleophilic, and a water soluble alkaline earth metal ion; in an amount equivalent to about 0.02 to 0.15 weight percent by weight of dry clay mass of calcium oxide; (c) adding a substantially water insoluble, non-ionizable organic liquid that is liquid under conditions of contact to the clay-water dispersion and emulsifying the mixture at a pH of 8–12, said organic liquid thus providing an extended interface to act as an extractant for removal of the clay impurities; (d) allowing the emulsion to separate into a clay-water layer and an organic liquid-rich emulsion layer with the clay impurities concentrated at the interface of the organic liquid droplets; (e) separating the resultant clay-water layer from the resultant organic-rich emulsion layer that contains the impurities concentrated at the interface; and (f) recovering a clay product of improved brightness from the clay-water layer.

5. Process for beneficiating a kaolin clay mass consisting essentially of (a) intimately mixing said clay mass with water and a deflocculating agent to produce an aqueous deflocculated dispersion of a kaolin clay mass having a pH of about 5–11; (b) subjecting the dispersion to intense agitation in the presence of an anionic collector reagent selected from the group consisting of fatty acids, resin acids, petroleum sulfonates and salts thereof, said collector reagent capable of selectively coating one component of said kaolin clay dispersion and rendinrg said component oleophilic, and a controlled amount of a water soluble alkaline earth metal ion; (c) adding a substantially water insoluble, non-ionizable organic liquid that is liquid under conditions of contact to the kaolin clay-water dispersion and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant kaolin clay-water layer from the resultant organic-rich emulsion layer that contains the impurities concentrated at the interface; and (f) recovering a kaolin clay product of improved brightness from the akolin clay-water layer.

6. Process for beneficiating a kaolin clay mass consisting essentially of (a) intimately mixing said clay mass with water and a deflocculating agent to produce an aqueous deflocculated dispersion of a kaolin clay mass, said clay mass having a substantial number of its particles finer than 325 mesh, said dispersion having a pH of about 5–11; (b) subjecting the dispersion to intense agitation in the presence of an anionic collector reagent selected from the group consisting of fatty acids, resin acids, petroleum sulfonates and salts thereof, said collector reagent capable of selectively coating one component of said clay dispersion and rendering said component oleophilic, and a controlled amount of a water soluble alkaline earth metal ion; (c) adding a substantially water insoluble, non-ionizable organic liquid which is liquid under the conditions of contact to the kaolin clay-water dispersion and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant kaolin clay-water phase from the resultant organic-rich emulsion layer that contains the impurities concentrated at the interface; and (f) recovering a kaolin clay product of improved brightness from the kaolin clay-water layer.

7. Process for beneficiating a kaolin clay consisting essentially of (a) intimately mixing said clay mass with water and a deflocculating agent to produce an aqueous deflocculated dispersion of a kaolin clay mass, said clay mass having a substantial number of its particles finer than 325 mesh, said dispersion having a pH of about 5–11; (b) subjecting the dispersion to intense agitation in the presence of about 0.02 to 1.0 weight percent by weight of dry clay mass of an anionic collector reagent selected from the group consisting of fatty acids, resin acids, petroleum sulfonates and salts thereof, said collector reagent capable of selectively coating one component of said clay dispersion and rendering said component oleophilic, and a water soluble alkaline earth metal ion in an amount equivalent to about 0.02 to 0.15 weight percent by weight of dry clay mass of calcium oxide; (c) adding a substantially water insoluble, non-ionizable organic liquid that is liquid under the conditions of contact to the kaolin clay-water dispersion and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant kaolin clay-water layer from the resultant organic-rich emulsion layer that contains the impurities concentrated at the interface; and (f) recovering a kaolin clay product of improved brightness from the kaolin clay-water layer.

8. Process for the recovery and concentration of titanium dioxide having a substantial particle size of less than 1 micron from a clay having a substantial particle size of less than 5 microns consisting essentially of (a) intimately mixing said clay mass with water and a deflocculating agent to produce an aqueous deflocculated dispersion of the clay, said dispersion having a pH of about 5–11; (b) subjecting the dispersion to intense agitation in the presence of about 0.02 to 1.0 weight percent by weight of dry clay mass of an anionic collector reagent selected from the group consisting of fatty acids, resin acids, petroleum sulfonates and salts thereof, said collector reagent capable of selectively coating the titanium dioxide and rendering said titanium dioxide oleophilic, and a water soluble alkaline earth metal ion in an amount equivalent to about 0.02 to 0.15 weight percent by weight of dry clay mass of calcium oxide; (c) adding a substantially water insoluble, non-ionizable organic liquid, that is, liquid under the conditions of contact to the clay-water dispersion and emulsifying the mixture at a pH of 8–12, said organic liquid thus providing an extended interface to act as an extractant for removal of the titanium dioxide; (d) allowing the emulsion to separate into a clay-water layer and an organic liquid-rich emulsion layer with the titanium dioxide concentrated at the interface of the organic liquid droplets; (e) separating the resultant clay-water layer from the resultant organic-rich emulsion layer that contains the titanium dioxide concentrated at the interface; and (f) recovering the titanium dioxide from the emulsion layer.

9. Process for beneficiating a delaminated kaolin clay consisting essentially of (a) intimately mixing said clay mass with water and a deflocculating agent to produce an aqueous deflocculated dispersion of a delaminated kaolin clay mass having a pH of about 5–11; (b) subjecting the dispersion to intense agitation in the presence of an anionic collector reagent selected from the group consisting of fatty acids, resin acids, petroleum sulfonates and salts thereof, said collector reagent capable of selectively coating one component of said delaminated kaolin clay dispersion and rendering said component oleophilic, and a controlled amount of a water soluble alkaline earth metal ion; (c) adding a substantially water insoluble, non-ionizable organic liquid that is liquid under the conditions of contact to the kaolin clay-water dispersion and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant kaolin clay-water layer from the resultant organic-rich emulsion layer that contains the impurities concentrated at the interface; and (f) recovering a kaolin clay product of improved brightness from the kaolin clay-water layer.

10. Process for beneficiating a kaolin clay consisting essentially of (a) intimately mixing said clay mass with water and a deflocculating agent to produce an aqueous deflocculated dispersion of a kaolin clay mass having a pH of about 5–11; (b) subjecting the dispersion to intense agitation in the presence of about 0.1 to 0.6 weight percent by weight of dry clay mass of an anionic collector reagent selected from the group consisting of fatty acids, resin acids, petroleum sulfonates and salts thereof, said collector reagent capable of selectively coating one component of said clay dispersion and rendering said component oleophilic, and a water soluble alkaline earth metal ion in an amount equivalent to about 0.1 weight percent by weight of dry clay mass of calcium oxide; (c) adding a substantially water insoluble, non-ionizable organic liquid that is liquid under the conditions of contact to the kaolin clay-water dispersion and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant kaolin clay-water layer from the resultant organic-rich emulsion layer that contains the impurities concentrated at the interface; and (f) recovering a kaolin clay product of improved brightness from the kaolin clay-water layer.

11. Process for beneficiating a kaolin clay consisting essentially of (a) intimately mixing said clay mass with water and a deflocculating agent to produce an aqueous deflocculated dispersion of a kaolin clay mass having a pH of about 6–7; (b) subjecting the dispersion to intense agitation in the presence of about 0.1 to 0.6 weight percent by weight of dry clay mass of an anionic collector reagent selected from the group consisting of fatty acids, resin acids, petroleum sulfonates and salts thereof, said collector reagent capable of selectively coating one component of said clay dispersion and rendering said component oleophilic, and a water soluble alkaline earth metal ion in an amount equivalent to about 0.1 weight percent by weight of dry clay mass of calcium oxide; (c) adding a substantially water insoluble, non-ionizable organic liquid that is liquid under the conditions of contact to the kaolin clay-water dispersion and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant koalin clay-water layer from the resultant organic-rich emulsion layer that contains the impurities concentrated at the interface; and (f) recovering a kaolin clay product of improved brightness from the kaolin clay-water layer.

12. Process for beneficiating a kaolin clay consisting essentially of (a) intimately mixing said clay mass with water and a deflocculating agent to produce an aqueous deflocculated dispersion of a kaolin clay mass having a pH of about 5–11; (b) subjecting the dispersion to intense agitation in the presence of about 0.4 weight percent by weight of the dry clay mass of oleic acid and calcium ion in an amount equivalent to about 0.1 weight percent by weight of dry clay mass of calcium oxide; (c) adding a substantially water insoluble, non-ionizable organic hydrocarbon which is liquid under the conditions of contact to the kaolin clay-water dispersion, the amount of said organic liquid being at least three percent by volume based on the volume of the aqueous dispersion, and emulsifying the mixture at a pH of 8–12, said organic liquid thus providing an extended interface to act as an extractant for removal of the kaolin clay impurities; (d) allowing the emulsion to separate into a kaolin clay-water layer and an organic liquid-rich emulsion layer with the kaolin clay impurities concentrated at the interface of the organic liquid droplets; (e) separating the resultant kaolin clay-water layer from the resultant organic-rich emulsion layer that contains the impurities concentrated at the interface; and (f) recovering a kaolin clay product of improved brightness from the kaolin clay-water layer.

13. Process according to claim 12 wherein the calcium ion is introduced into the mixture in the form of calcium chloride.

14. Process for beneficiating a kaolin clay consisting essentially of (a) intimately mixing said clay mass with water and a deflocculating agent to produce an aqueous deflocculated dispersion of a kaolin clay mass having a pH of about 5–11; (b) subjecting the dispersion to intense agitation in the presence of about 0.4 weight percent by weight of dry clay mass of oleic acid and calcium ion in an amount equivalent to about 0.1 weight percent by weight of dry clay mass of calcium oxide; (c) adding naphtha to the kaolin clay-water dispersion and emulsifying the mixture at a pH of 8–12, said naphtha thus providing an extended interface to act as an extractant for removal of the clay impurities; (d) allowing the emulsion to separate into a kaolin clay-water layer and a naphtha rich emulsion layer with the clay impurities concentrated at the interface of the emulsion droplets; (e) separating the resultant kaolin clay-water layer from the resultant naphtha-rich emulsion layer that contains the impurities concentrated at the interface; and (f) recovering a kaolin clay product of improved brightness from the kaolin clay-water layer.

15. Process for beneficiating a multicomponent mineral mass in which the particle size in the multicomponent mineral mass is finer than 200 mesh consisting essentially of (a) intimately mixing said multicomponent mineral mass with water and a deflocculating agent to produce an aqueous deflocculated dispersion of a mineral material; (b) subjecting the dispersion to intense agitation in the presence of an anionic collector reagent selected from the group consisting of fatty acids, resin acids, petroleum sulfonates and salts thereof, said collector reagent capable of selectively coating one component of said mineral dispersion and rendering said component oleophilic, and a controlled amount of an alkaline earth metal activator ion under controlled conditions of pH; (c) adding a substantially water insoluble, non-ionizable organic liquid that is liquid under the conditions of contact to the mineral-water dispersion and emulsifying the mixture at a pH of 8–12, said organic liquid thus providing an extended interface to act as an extractant for a mineral of the multicomponent mineral mass; (d) allowing the emulsion to separate into a mineral-water layer and an organic liquid-rich emulsion layer with a mineral component concentrated at the interface of the organic liquid droplets; (e) separating the resultant mineral-water layer from the resultant organic-rich emulsion layer that contains a mineral component concentrated at the interface; and (f) recovering a mineral from each of the mineral-water layer and the organic-rich emulsion layer.

References Cited
UNITED STATES PATENTS

| Re. 14,583 | 1/1919 | Schwerin | 209—5 |
| 667,222 | 2/1901 | Ivery | 209—5 |
| 763,260 | 6/1904 | Cattermole | 209—49 |
| 1,791,959 | 2/1931 | Feldenheimer | 209—5 |
| 2,165,607 | 7/1939 | Blow | 209—9 X |
| 2,686,592 | 8/1954 | Miller | 209—163 |
| 2,894,628 | 7/1959 | Duke | 209—166 |
| 3,259,237 | 7/1966 | Schoeld | 209—9 |

FOREIGN PATENTS 238,845    5/1958    Australia.

HARRY B. THORNTON, Primary Examiner.

R. HALPER, Assistant Examiner.

U.S. Cl. X.R.

209—49, 171, 172